United States Patent [19]
LoGuidice

[11] 3,833,936
[45] Sept. 10, 1974

[54] WELDER'S MASK
[76] Inventor: Roberto C. LoGuidice, 12525 N.W. 21 Pl., Miami, Fla. 33167
[22] Filed: Jan. 5, 1973
[21] Appl. No.: 321,433

[52] U.S. Cl. .................................................. 2/8
[51] Int. Cl. ............................................. A61f 9/06
[58] Field of Search .......... 2/8; 219/147; 318/54, 65

[56] References Cited
UNITED STATES PATENTS

| | | | |
|---|---|---|---|
| 1,699,652 | 1/1929 | Brinkhaus | 2/8 |
| 2,347,845 | 5/1944 | Schane | 318/54 |
| 2,417,883 | 3/1947 | Oschin | 2/8 |
| 3,579,638 | 5/1971 | Davis et al. | 2/8 |

Primary Examiner—James R. Boler
Assistant Examiner—Wai M. Chan
Attorney, Agent, or Firm—James B. Lake, Jr.

[57] ABSTRACT

An optically protective viewing glass is slidably mounted in slides vertically fixed at the sides of a viewing slot in a face shield. The viewing glass is driven between opposite work performing and work viewing positions by a motor and synchronized side gear trains to prevent jamming of the glass in the slides. The motor is mounted on the face shield and energized from a power source, similarly mounted, through circuit means having two parallel branches, one branch for energizing the motor to drive the viewing glass to one of its opposite positions, and the other branch to the other of its opposite positions. Limiting switches, respectively connected in the parallel branches and mounted on the face shield at the respective opposite positions of the viewing glass, are operable by the viewing glass reaching either of said positions to open the limit switch in the parallel branch energized to drive said glass to the position just reached and simultaneously to close the limit switch in the other parallel branch. An energizing switch is mounted on the face shield and connected in both branch circuits to alternately close the circuit of one of said parallel branches and open the other as it is mouth-operated by a welder. The limiting and energizing switches are coordinated to alternately drive the viewing glass to opposite positions each time the energizing switch is operated.

4 Claims, 17 Drawing Figures

PATENTED SEP 10 1974 3,833,936
SHEET 1 OF 3
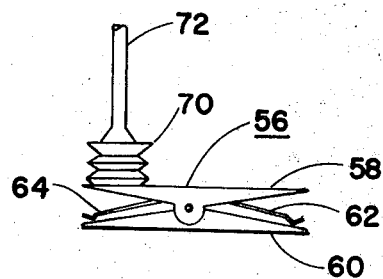
FIG. 8
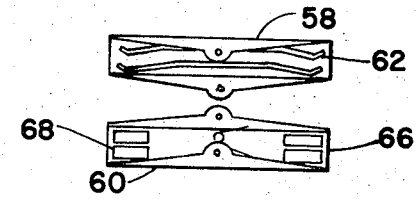
FIG. 9
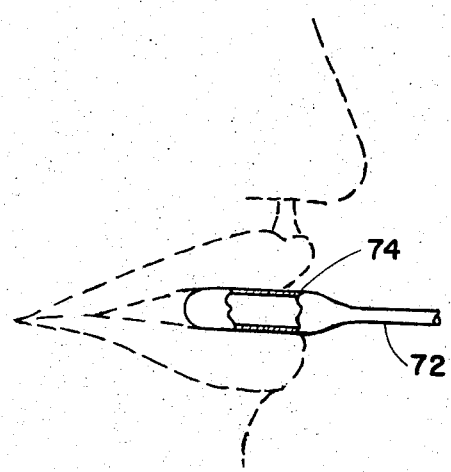
FIG. 7
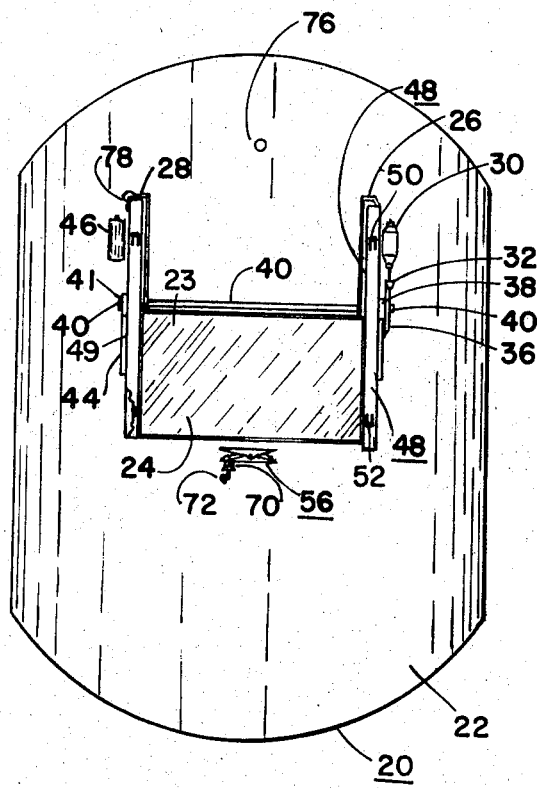
FIG. 1
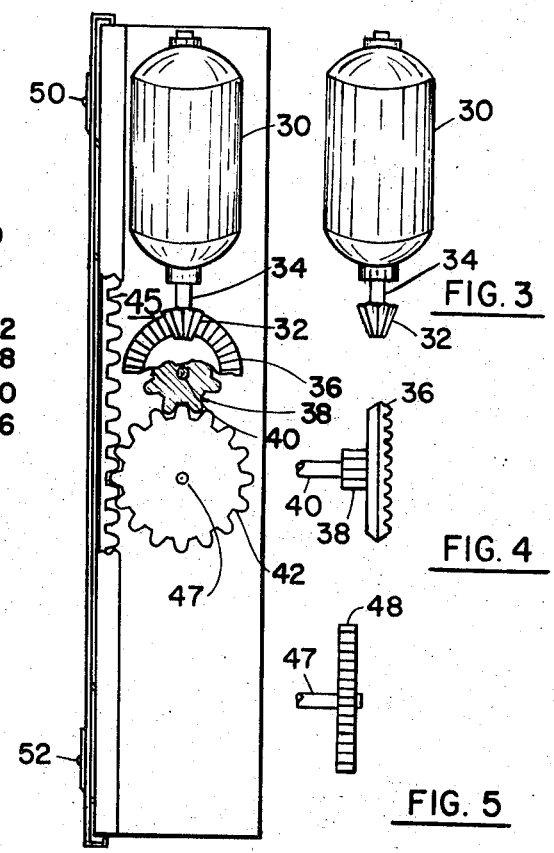
FIG. 2
FIG. 3
FIG. 4
FIG. 5

WELDER'S MASK

The invention relates to welder's masks and more particularly to a welder's mask with slidable viewing glass.

The invention is an improvement of my prior invention in this field as disclosed in my U.S. Pat. No. 3,540,058. In this invention, the slidable viewing glass was driven in one direction by a motor and in the other by springs. The motor drive was by center pulleys and line which slips at the end of travel of the glass enough to prevent the motor from burning out but not so much as to permit the springs to move the glass in the opposite direction as long as the motor was running.

An object of the invention is to provide a welder's mask with a slidable viewing glass that is semi-automatically driven between viewing and working positions.

Another object of the invention is to provide means for slidably driving said viewing glass between positions without jamming.

A further object of the invention is to provide control means for a minimum use of a reversible driving motor for moving said viewing glass.

Other objects and a more complete understanding of the invention may be had by referring to the following specification, claims and drawings in which:

FIG. 1 is a front view of the invention with protective cover off,

FIG. 2 is an enlarged side view of a part of FIG. 1,

FIGS. 3–6 are enlarged side views of matter appearing in FIG. 2,

FIG. 7 is a partially broken-away view of a mouth control piece in use,

Figure 10:
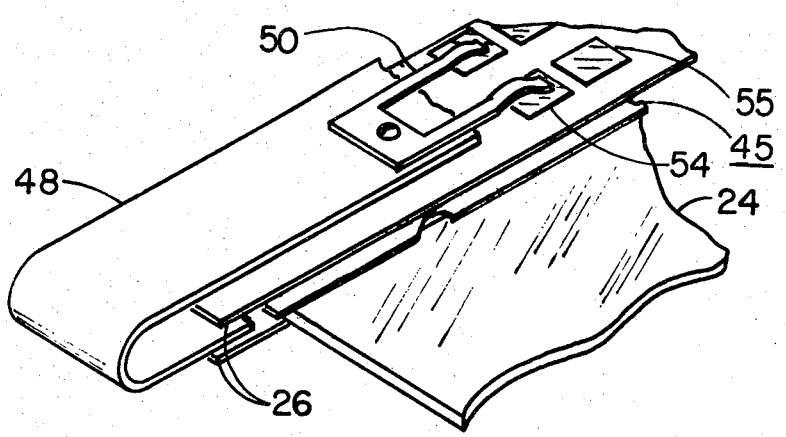
Figure 11:
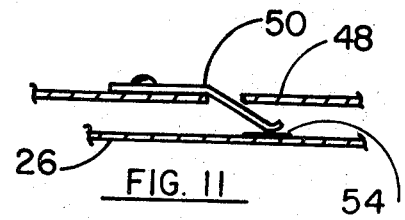
Figure 12:
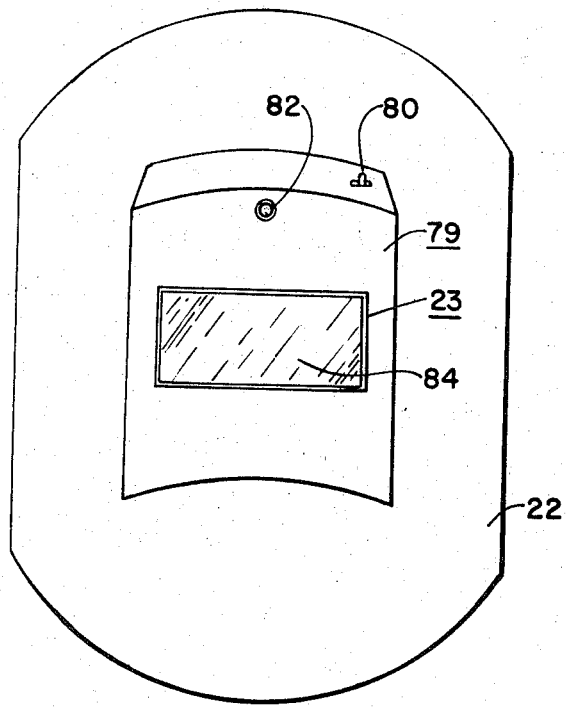
Figure 6:
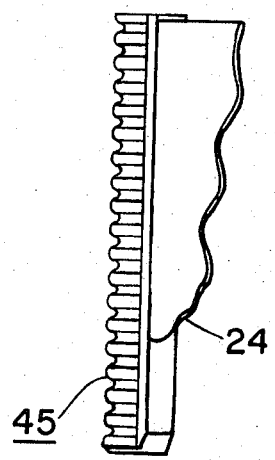
Figure 13:
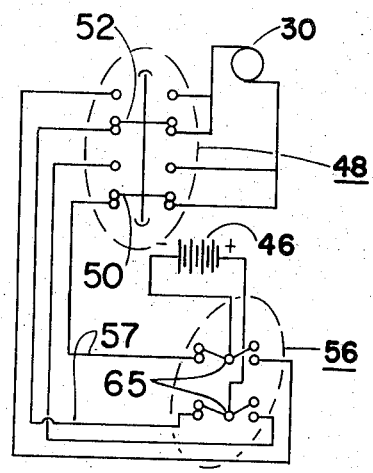
Figure 14:
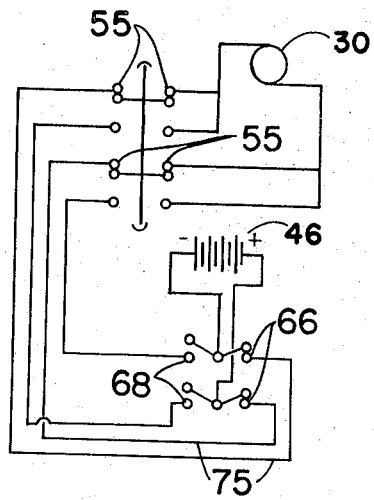
Figure 15:
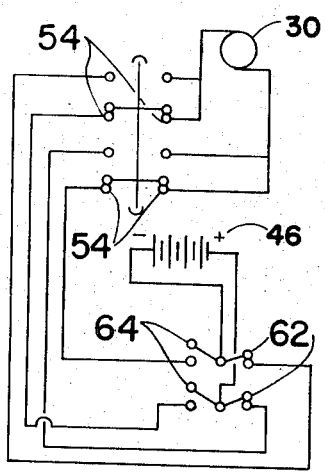
Figure 16:
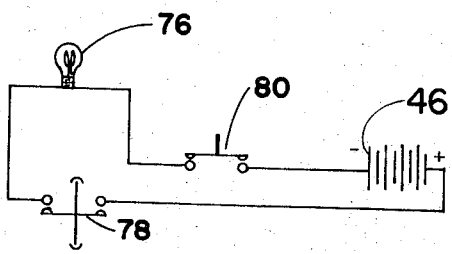
Figure 17:
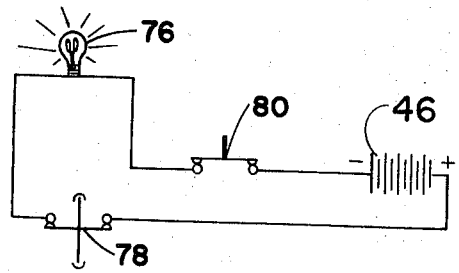

FIG. 8 is a side view of energizing switch and other end of mouth control piece of FIG. 7, FIG. 9 is an exploded view of the energizing switch of FIG. 8, FIG. 10 is an enlarged perspective view, partially cutaway, of a portion mounting for viewing glass and associated limit switches, FIG. 11 is an enlarged side view of a limit switch blade mounted, FIG. 12 is a front view of the invention with protective cover, FIGS. 13–15 are schematic wiring diagrams of the motor control circuits, and FIGS. 16 and 17 are schematic wiring diagrams of illuminating lamp circuit.

Referring to FIGS. 1 and 2, a welder's mask 20, having a face shield 22 defining a viewing slot 23, and a viewing glass 24 slidably mounted thereover in vertical channel irons 26 and 28, rigidly spaced apart horizontally and fixed parallel on face shield 22. An electric motor 30 is fastened to shield 22 adjacent channel iron 26, and has a crown gear 32, fixed to the end of its drive shaft 34, that drives a gear train means consisting of a bevel gear 36 that is mounted back to back with a first spur gear 38, both being fixed on an end of a shaft 40, said shaft 40 extending between and mounted for rotation in channel irons 26 and 28. A second identical spur gear 41 is mounted on the end of shaft 40 adjacent channel iron 28. Spur gears 38 and 41 respectively drive second spur gears 42 and 44 which are independently mounted for rotation respectively on channel irons 26 and 28 by axles 47 and 49. Racks 45 fastened to respective sides of viewing glass 24 are engaged by second spur gears 42 and 44 for slidably driving viewing glass 24 from a working position as shown in FIG. 1 to a viewing position at the upper ends of channel irons 26 and 28.

A battery 46 is mounted on the face shield 22 adjacent channel iron 28.

Referring additionally to FIGS. 10 and 11, each of a pair of limit switches 48 comprises a pair of spaced apart flexible blades 50 and 52 that cooperate with a pair of stationary contacts 54 and 55 respectively. Lower and upper blades 50 and 52 are mounted respectively adjacent the vertical extremities of slidable rack 45, and lower and upper contacts 54 and 55 are mounted on the vertical extremity channel iron 26.

Referring to FIGS. 1 and 7–9, an energizing switch 56 is mounted on face shield 22. Switch 56 is of the double throw, double pole type in which an upper part 58 having flexible conducting arms 62 and 64 is pivoted by a pivot 65 to a fixed lower part 60 having double pairs of contacts 66 and 68. A bellows 70 is mounted on an end of pivoted upper part 58 and a tube 72 connects bellows 70 to a closed hollow mouthpiece 74. When bitten the fluid content of the mouthpiece expands bellows 70 to pivot upper part 58 and reverse the polarity of electric current to limit switches 48.

Referring to FIGS. 13–15, motor 30 is connected to battery 46 thru limiting switches 48 and energizing switch 56. FIG. 13 shows the position of limit switches 48 with movable blades 50 and 52 in contact with contacts 54 and the viewing glass in working or down position. With energizing switch 56 closed as shown with movable contacts 64 in contact with stationary contacts 68, the motor is energized through parallel branch 57 to raise viewing glass 24 through side gear trains 32, 36, 38, 42 and racks 45. When glass 24 reaches viewing position rack 45 is in a position such that flexible blades 52 of limit switches 48 make in contact with contacts 55 as shown in FIG. 14. Since the energizing switch remain as shown in FIG. 13, the circuit is broken at the pair of limit contacts 54 and the motor stops. When energizing switch 56 is operated by mouthpiece 74 and bellows 70 to position shown in FIG. 14, the circuit is completed through parallel branch 75 with current reversed to the motor causing it to rotate reversely and thru the action of said gear trains to lower viewing glass to its lower or working position. FIG. 15 shows the arrangement of switches 56 and 48 when glass 24 reaches working position with the current carrying circuit 75 broken at limit contacts 55 of switches 48.

Referring to FIG. 1, 16 and 17 a lamp 76 is mounted on face shield 22. A contact switch 78 is mounted at the upper extremity of channel iron 28 and that of the adjacent side of viewing glass 24, and connected in a series circuit with lamp 76, hand operated switch 80, and battery 46 as shown in figures. Switch 78 is closed by glass 24 being raised to its viewing position and opened as said glass is lowered to working position. Switch 80 is used to manually extinguish lamp 76 when the glass is raised but illumination is not desired.

Referring to FIG. 12, a cover 79 is provided for covering the movable parts. Clear glass panels 82 and 84 are provided to cover lamp 76 and viewing slot 23.

What is claimed is:

1. An improved welder's mask, having eye protective viewing glass vertically slidable in a face shield between opposite working and viewing positions, comprising in combination: similar side gear train means synchronously driven and mounted adjacent vertical sides of a viewing slot defined in said face shield for sliding said eye protective viewing glass without jamming to said viewing and working positions respectively over and above said viewing slot; reversible motor means mounted for rotation of said side gear train means on said face shield; power means mounted on said face shield for energizing said reversible motor means; circuit means having parallel branches connecting said power means to said motor means; switching means connected in said circuit means and semiautomatically controllable to alternately energize said parallel branches with reversible power for sequentially rotating said motor means in opposite directions of rotation and said viewing glass to opposite viewing and working positions.

2. An improved welder's mask as described in claim 1 wherein said reversible motor means is an electric motor adapted to reverse its direction of rotation by reversing polarity of said power flow from said power means.

3. An improved welder's mask as described in claim 1 wherein said power means is a dry cell battery.

4. An improved welder's mask as described in claim 1 wherein said switching means comprise: a double throw, double pole energizing switch connected in said circuit to said power means and parallel branches and adapted to sequentially and oppositely energize said respective parallel branches when said energizing switch is operated by a welder; a pair of limit switches respectively connecting and disconnecting in said circuit the parallel branches to said motor means alternately and simultaneously, said limit switches being respectively mounted on said face shield at the limits of travel at said working and viewing positions of said viewing glass and operable by said viewing glass as it reaches each position respectively to open said circuit means between the motor means and one parallel branch that is closed by a side of said double throw double pole energizing switch and thereby stopping said motor means, and to reversely close the circuit means between the motor means and the other parallel branch that is open by the other side of said energizing switch, whereby operating said energizing switch from side to side respectively, alternately causes the viewing glass to slide to opposite positions and to automatically stop said motor means at each position.

* * * * *